No. 794,314. Patented July 11, 1905.

UNITED STATES PATENT OFFICE.

BERNHARD RICHARD, OF BASEL, SWITZERLAND, ASSIGNOR TO ANILINE COLOUR AND EXTRACT-WORKS FORMERLY JOHN A. GEIGY, OF BASEL, SWITZERLAND.

PROCESS OF DYEING.

SPECIFICATION forming part of Letters Patent No. 794,314, dated July 11, 1905.

Application filed February 2, 1905. Serial No. 243,808.

*To all whom it may concern:*

Be it known that I, BERNHARD RICHARD, doctor of philosophy, a citizen of the Kingdom of Bavaria, residing at Basel, Switzerland, have invented a new and useful Improvement in Processes of Dyeing; and I do hereby declare the following to be an exact and clear description of my invention.

I have found that violet to blue shades of extraordinary clearness and great fastness against the action of light can be obtained on dyeing wool with certain azo dyestuffs derived from ortho-amido-phenol derivatives and on treating the dye-goods with copper salts. By the action of the copper salts the original shades varying from yellowish to blue-red are changed into violet to blue shades distinguished for their extraordinary clearness and fastness to light. The same result is to be obtained if the dyestuffs are directly dyed in presence of copper salts. The coloring-matters which I use for this purpose can be prepared by combining the diazo compounds of ortho-amido-phenol derivatives having the following general formula:

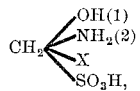

X meaning a hydrogen atom which can be replaced by

CH$_3$, NHCOCH$_3$, NO$_2$, halogen, SO$_3$H, with alpha-naphthylamin or aethyl-alpha-naphthylamin, having the formula

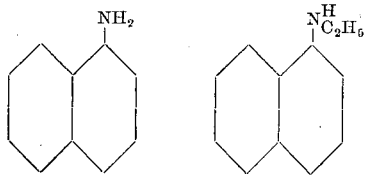

The dyestuffs obtained from aethyl-alpha-naphthylamin yield greener shades of greater clearness than those of alpha-naphthylamin. Further, I have found that the best results are obtained with the coloring-matters from ortho-amido-phenol derivatives in which the sulfo-acid group is placed in ortho to the hydroxyl, such as amido-cresol-sulfo-acid, (OH:NH$_2$:CH$_3$:SO$_3$H=1:2:4:6,)

chloro-amido-phenol-sulfo-acid, (OH:NH$_2$:Cl:SO$_3$H=1:2:4:6,)

nitro-amido-phenol-sulfo-acid, (OH:NH$_2$:NO$_2$:SO$_3$H=1:2:4:6,)

acetyl-amido-amido-phenol-sulfo-acid, (OH:NH$_2$:NHCOCH$_3$:SO$_3$H=1:2:4:6,)

amido-phenol-disulfo-acid, (OH:NH$_2$:SO$_3$H:SO$_3$H=1:2:4:6.)

In carrying out my process practically I can proceed as follows: Place the wool in a bath containing five per cent. acetic acid, two per cent. of the dyestuff prepared by combination of diazotized amido-cresol-sulfo-acid (OH:NH$_2$:CH$_3$:SO$_3$H=1:2:4:6) and aethyl-alpha-naphthylamin, bring slowly to boil, and boil for forty-five to sixty minutes. The bluish-red shade thus obtained is changed into a clear reddish marine-blue by boiling the dyed wool for one-half hour with two per cent. sulfate of copper.

Of course instead of acetic acid another suitable acid may be used, such as sulfuric acid or the like. It is also suitable to add the copper sulfate to the above-prepared dye-bath from beginning and to dye in presence of the copper salt. The wool is dyed directly blue in this manner.

Having now described my invention and in what manner the same is to be performed, what I claim as new, and desire to secure by Letters Patent, is—

1. The herein-described process for producing on wool violet to blue shades, which process consists in first dyeing wool from acid-bath with dyestuffs obtained by combination of alpha-naphthylamin and aethyl-alpha-naphthylamin with the diazo compounds of ortho-amido-phenol derivatives having the following general formula

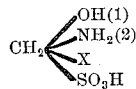

and then treating the dyed goods with copper salts, substantially as described.

2. The process consisting in dyeing wool in the acid-bath in the presence of copper salts with dyestuffs obtained by combination of alpha-naphthylamin and aethyl-alpha-naphthylamin with the diazo compounds of ortho-amido-phenol derivatives having the following general formula

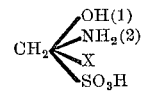

substantially as described.

In testimony whereof I have signed this specification in the presence of two subscribing witnesses.

BERNHARD RICHARD.

Witnesses:
GEO. GIFFORD,
ALBERT GRAETER.